US012060733B2

(12) United States Patent
Fishman

(10) Patent No.: US 12,060,733 B2
(45) Date of Patent: Aug. 13, 2024

(54) BICYCLE CABLE LOCK

(71) Applicant: Delta Cycle Corporation, Randolph, MA (US)

(72) Inventor: Udi Fishman, Los Gatos, CA (US)

(73) Assignee: Delta Cycle Corporation, Randolph, MA (US)

(*) Notice: Subject to any disclaimer, the term of this patent is extended or adjusted under 35 U.S.C. 154(b) by 164 days.

(21) Appl. No.: 17/402,873

(22) Filed: Aug. 16, 2021

(65) Prior Publication Data

US 2023/0050454 A1 Feb. 16, 2023

(51) Int. Cl.
*E05B 67/00* (2006.01)
*E05B 71/00* (2006.01)
*E05B 73/00* (2006.01)

(52) U.S. Cl.
CPC ............ *E05B 67/003* (2013.01); *E05B 71/00* (2013.01); *E05B 73/0005* (2013.01)

(58) Field of Classification Search
CPC .... E05B 67/003; E05B 71/00; E05B 73/0005; E05B 73/0029
See application file for complete search history.

(56) References Cited

U.S. PATENT DOCUMENTS 3,435,642 A * 4/1969 Del ....................... E05B 67/003 24/635
3,855,825 A * 12/1974 Pickard ................... E05B 71/00 70/226
3,933,015 A 1/1976 Balicki
4,075,878 A 2/1978 Best
4,779,432 A * 10/1988 Frontera-Mariani ........................ E05B 67/003 70/48
4,850,207 A * 7/1989 Ylven ................... E05B 67/003 70/49
4,998,422 A * 3/1991 Borgmann .............. E05B 67/24 70/38 A
5,170,650 A * 12/1992 Kortenbrede ......... E05B 67/365 70/386

(Continued)

FOREIGN PATENT DOCUMENTS

CN 103437607 A 12/2013
DE 102004019939 A1 11/2005

(Continued)

OTHER PUBLICATIONS

Written Opinion of the International Searching Authority for International Application No. PCT/US2022/040033, dated Nov. 3, 2022, six (6) pages.

(Continued)

*Primary Examiner* — Christine M Mills
*Assistant Examiner* — Faria F Ahmad
(74) *Attorney, Agent, or Firm* — Iandiorio Teska & Coleman, LLP

(57) ABSTRACT

A cable lock includes a cable, a shackle pin connected to one end of the cable, and a lock body connected to the other end of the cable. The lock body includes at least one lock member pivotable from an open position disengaged from the shackle pin and biased to a closed position engaging the shackle pin, a key mechanism including a plug rotatable when a key is inserted therein, and a cam member rotated by the plug and including a cam surface configured to pivot the lock member to the open position.

30 Claims, 8 Drawing Sheets

(56) References Cited

U.S. PATENT DOCUMENTS

| | | | | |
|---|---|---|---|---|
| 5,275,027 | A * | 1/1994 | Eklof | A47F 5/0861 70/38 A |
| 5,447,043 | A | 9/1995 | Hwang | |
| 5,610,587 | A | 3/1997 | Fujiuchi et al. | |
| 5,791,170 | A * | 8/1998 | Officer | E05B 67/003 70/49 |
| 5,829,280 | A * | 11/1998 | Chen | E05B 67/003 70/386 |
| 5,868,012 | A * | 2/1999 | Chun-Te | E05B 67/003 70/30 |
| 5,893,283 | A | 4/1999 | Evans et al. | |
| 5,992,187 | A | 11/1999 | Derman | |
| 6,363,758 | B1 * | 4/2002 | Ling | E05B 37/025 70/30 |
| 6,401,502 | B1 * | 6/2002 | Yang | E05B 73/0082 70/30 |
| 6,419,258 | B1 * | 7/2002 | Grote | B60D 1/60 280/507 |
| 6,470,718 | B1 * | 10/2002 | Yang | E05B 67/003 70/30 |
| 6,523,373 | B1 * | 2/2003 | Su | E05B 73/0005 70/426 |
| 6,609,399 | B1 * | 8/2003 | Daniels, Jr. | E05B 67/003 70/30 |
| 6,786,297 | B1 | 9/2004 | Menard | |
| 6,997,023 | B1 * | 2/2006 | Huang | E05B 37/0034 70/284 |
| 7,055,656 | B2 | 6/2006 | Drew | |
| 7,104,093 | B2 * | 9/2006 | Ling | E05B 73/0005 70/30 |
| 7,152,439 | B1 * | 12/2006 | Chang | E05B 37/025 24/134 P |
| 7,401,481 | B1 * | 7/2008 | Lin | E05B 73/0005 70/58 |
| 7,870,764 | B2 * | 1/2011 | Burmesch | E05B 67/003 70/38 C |
| 8,297,087 | B1 * | 10/2012 | Lin | E05B 37/025 70/318 |
| 9,013,306 | B2 | 4/2015 | Koh et al. | |
| 9,187,934 | B1 * | 11/2015 | Lee | E05B 73/0017 |
| 9,495,820 | B1 | 11/2016 | Li | |
| 9,679,429 | B2 | 6/2017 | Duncan et al. | |
| 9,797,162 | B2 * | 10/2017 | Maguire | E05B 47/0009 |
| 9,847,003 | B2 | 12/2017 | Sayegh et al. | |
| 10,053,171 | B1 * | 8/2018 | Young | B62H 5/00 |
| 2006/0179899 | A1 * | 8/2006 | Yu | E05B 37/025 70/21 |
| 2011/0041569 | A1 * | 2/2011 | Yu | E05B 67/003 70/15 |
| 2011/0260867 | A1 | 10/2011 | McCracken et al. | |
| 2011/0265526 | A1 | 11/2011 | Zuraski | |
| 2014/0007628 | A1 | 1/2014 | Beaulieu et al. | |
| 2017/0002586 | A1 | 1/2017 | Lee | |
| 2017/0058565 | A1 | 3/2017 | Sanchez et al. | |
| 2017/0069154 | A1 | 3/2017 | Hilton et al. | |
| 2018/0290702 | A1 | 10/2018 | Carlier | |
| 2018/0340351 | A1 | 11/2018 | Harkonen et al. | |
| 2019/0106170 | A1 * | 4/2019 | Hagen | E05B 67/003 |
| 2019/0300082 | A1 | 10/2019 | Shen | |
| 2019/0368234 | A1 | 12/2019 | Kolb et al. | |
| 2020/0011085 | A1 | 1/2020 | Lai | |
| 2020/0071964 | A1 | 3/2020 | Hill | |
| 2021/0131148 | A1 | 5/2021 | Schroll | |

FOREIGN PATENT DOCUMENTS

| | | | | |
|---|---|---|---|---|
| DE | 102015005411 | A9 | 11/2016 | |
| DE | 202018102165 | U1 | 6/2018 | |
| EP | 0520154 | A1 | 12/1992 | |
| KR | 101298901 | B1 | 8/2013 | |
| NL | 2000149 | C2 | 1/2008 | |
| WO | 2013093918 | A1 | 6/2013 | |
| WO | WO-2013093918 | A1 * | 6/2013 | E05B 17/0062 |
| WO | 2015044760 | A1 | 4/2015 | |
| WO | WO-2015044760 | A1 * | 4/2015 | E05B 17/226 |

OTHER PUBLICATIONS

Written Opinion of the International Searching Authority for International Application No. PCT/US2022/012701 dated Apr. 11, 2022, five (5) pages.

* cited by examiner

BICYCLE CABLE LOCK

FIELD OF THE INVENTION

This invention relates to bicycle cable locks.

BACKGROUND OF THE INVENTION

Several cable lock styles are known but can be easier to defeat by cutting the cable and/or breaking the integrity of the lock body. Bicycles are increasingly expensive and lightweight and their owners would appreciate a lightweight but highly secure cable lock.

SUMMARY OF THE INVENTION

One specific design features a flexible cable key lock with a difficult to defeat cable and a lock body which is also difficult to defeat. The lock is made smaller and lighter due to a unique configuration of the mechanisms which engage the lock shackle in the lock body.

Featured is a cable lock comprising a cable, a shackle pin connected to one end of the cable, and a lock body connected to the other end of the cable. The preferred lock body includes at least one lock member pivotable from an open position disengaged from the shackle pin and biased to a closed position engaging the shackle pin, a key mechanism including a plug rotatable when a key is inserted therein, and a cam member rotated by the plug and including a cam surface configured to pivot the lock member to the open position.

In one example, there are a plurality of spaced lock members and a flexible band about the spaced lock members. The lock member may include a latch portion and the shackle pin includes a seat for the latch portion. Preferably, the lock body includes a jam surface for the lock member latch portion.

In one version, a spring biases the shackle pin out of the lock body, the key mechanism is configured such that the key cannot be removed unless the plug is rotated to the locked position, and the shackle pin includes a truncated cone distal end configured to drive the lock member to the open position as the shackle pin truncated cone distal end enters the lock body. Preferably, the cam includes a keyed opening and the key mechanism plug includes a distal post received in the cam keyed opening. The cam may further include a curved track and the key mechanism plug further includes a curved rail received in the curved track of the cam to limit the rotation of the cam. The lock body preferably includes two halves and the reinforcing ring is disposed at the joint between the two lock body halves. Preferably, the majority of the lock body includes curved surfaces. Preferably, the cable includes a wire rope surrounded by a sheath itself surrounded by interlocking metal beads.

Also featured is a cable lock comprising a cable, and a shackle pin connected to one end of the cable. A lock body is connected to the other end of the cable and includes at least one lock member pivotal from an open position disengaged from the shackle pin and biased to a closed position engaging the shackle pin, a key mechanism including a plug rotatable when a key is inserted therein, and a cam member rotated by the plug and including a cam surface which engages and pivots the lock member to its open position when a key is inserted into the key mechanism plug and rotated and in which the cam surface does not engage the lock member when the key is removed from the lock member plug.

The subject invention, however, in other embodiments, need not achieve all these objectives and the claims hereof should not be limited to structures or methods capable of achieving these objectives. For example, the cable lock is useful for securing items of value other than bicycles.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
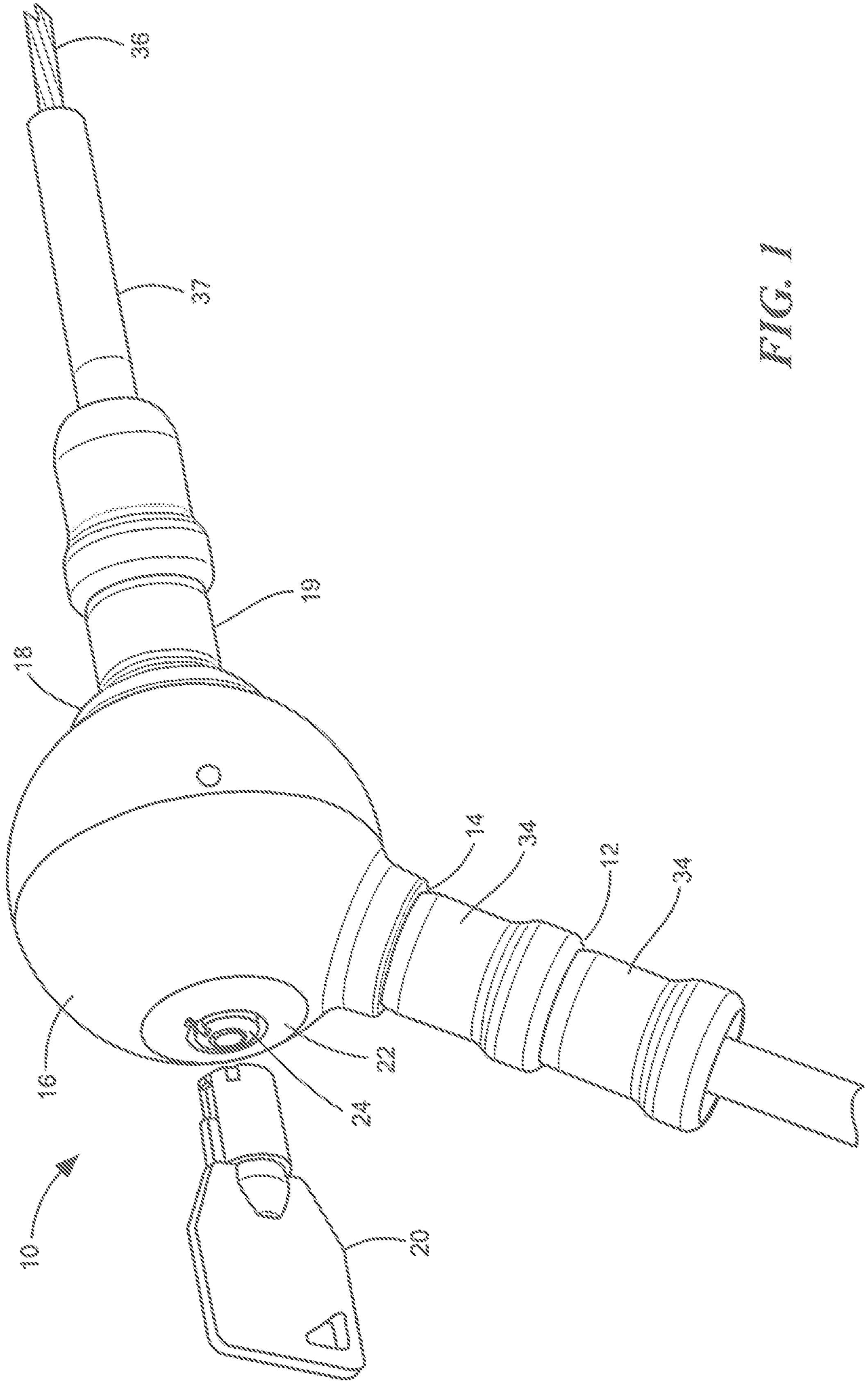
FIG. 1 is a schematic three-dimensional view of an example of a new bicycle cable lock.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an example of a lightweight, hard to defeat cable lock 10 for bicycles and other items of value. Flexible cable 12 extends from port 14 in lock body 16 which is constructed of two halves 70*a* and 70*b* and to another port 18 in lock body 16. Key 20 is inserted into key mechanism 22 and rotates plug 24 to unlock the lock and to remove cable end 19 from the lock body.

Figure 2A:
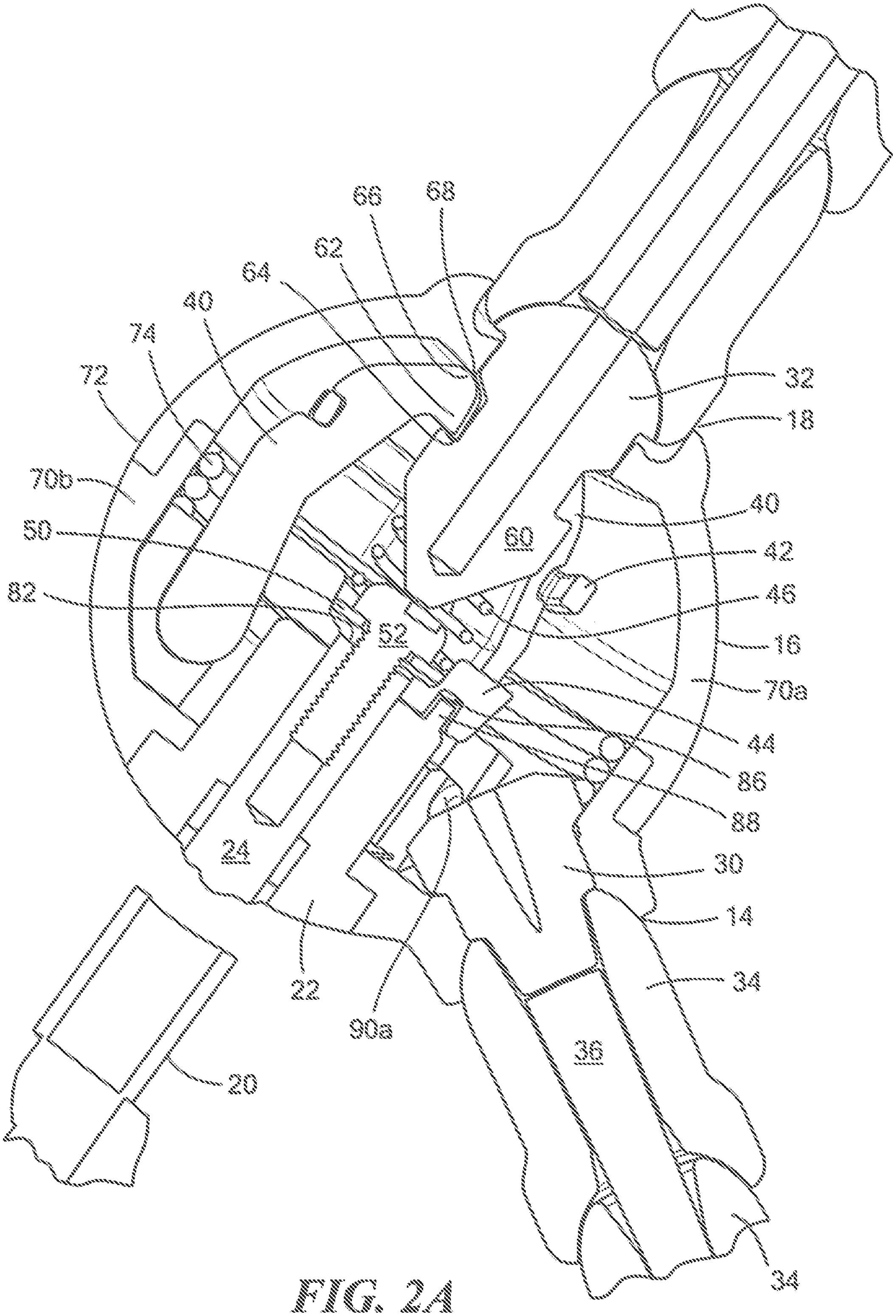
FIG. 2A is a schematic cross-sectional view of the lock of FIG. 1 in the locked configuration.
Figure 2B:
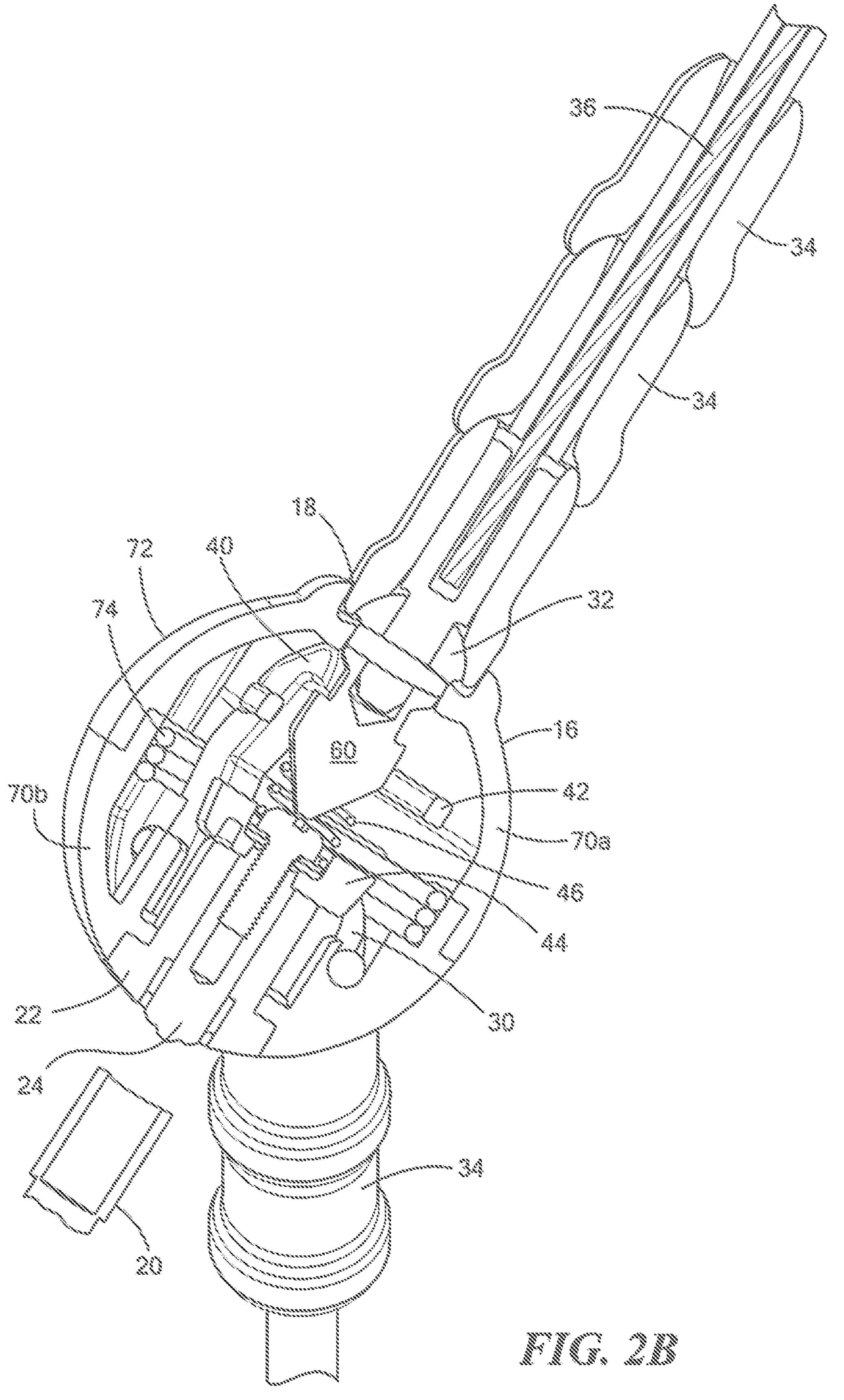
FIG. 2B is a schematic view showing a slightly different version of the lock of FIG. 1.

As shown in FIGS. 2A-2B, one end of cable 12 is fitted with cable end 30 secured within port 14 and the other end of cable 12 is fitted with shackle pin 32 inserted into port 18. Cable 12 is preferably constructed according to U.S. Pat. No. 7,055,656 incorporated herein by this reference and it is fairly difficult to defeat due to the use of interlocking rotatable metal bead members 34 about internal metal wire rope 36. Interlocking beads 34 (e.g., steel) are difficult to cut and tools cannot be jammed between them. A protective (e.g., Kevlar®) sheath 37 may be disposed between bead members 34 and the internal wire rope 36. Sheath 37 is strong and flexible and is difficult to cut. Lock body 16 is mostly spherical in construction with no or few easily gripped surfaces. The mostly spherical shape of the lock body makes it difficult to grasp with a cutter or gripping tool and difficult to cut or damage. Egg or other shapes can be employed such that the majority of the lock body includes curved surfaces and/or is devoid or mostly devoid of easily gripped corners, edges, or surfaces. A protective (e.g., silicone) sheath may be disposed about the interlocking beads to protect the bicycle and the lock body may also include a protective coating such as silicone.

Figure 3:
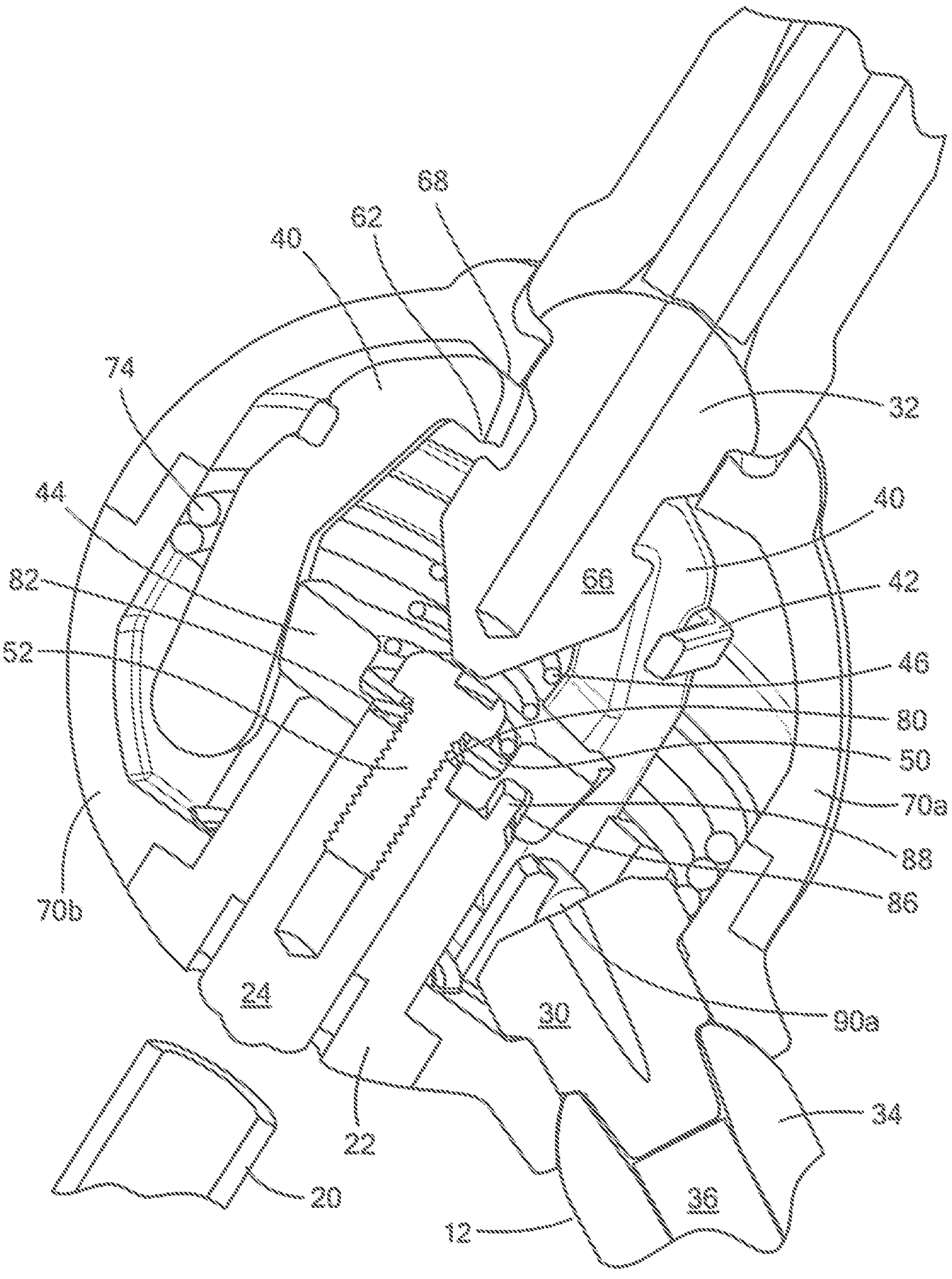
FIG. 3 is a schematic cross-sectional view showing the lock of FIG. 2 in its unlocked configuration.

In the example shown, three-spaced lock members 40 are pivotally mounted in one half of the lock body **70*b* and pivot outwardly (an open or unlocked position. FIG. 3) disengaged from shackle pin 32 and inwardly (a closed or locked position, FIG. 2A) engaged with shackle pin 32. Lock members 40 are biased to their shackle engagement position via flexible (e.g., silicone) band 42. There may be only one spring biased lock member, two, three, or more. Disk-like cam member 44 is rotated by key mechanism plug 24 and functions to pivot the lock members 40 outwardly to their open position disengaged from shackle pin 32. Spring 46 is disposed about shackle pin 32 and biases shackle pin 32 out of the lock body. In the specific design shown, one end of spring 46 is held between cam 44 and washer 50. Fastener 52 extends through washer 50 and cam 44 and extends into lock body plug 24. Thus, fastener 52 secures cam 44** in the lock body in a fashion such that the cam can rotate.

The key mechanism is preferably configured such that the key can only be removed when the lock members are in their closed position. As the shackle pin 32 distal truncated cone end 60 enters the lock body, lock members 40 are pivoted outward. As the shackle pin is driven further into the lock body channel, the latch portion 62 of the lock members engaged seat 64 of the shackle pin 32 because flexible band 42 biases the lock members into their closed position pivoted inward. When the key is inserted into the lock mechanism plug and rotated, the plug 24 turns cam 44 which pivots the lock members outward to their open position and then shackle pin 32 can be withdrawn out of the lock body. Spring 46 urges shackle pin 32 out of the lock body. Notably, when the lock is locked and the lock members 40 are pivoted inward, there is no stress on the cam or the lock mechanism plug. This makes the lock more difficult to defeat. And, if the cable is pulled, the head 66 of the lock member latch portion 62 jams against surfaces 68 of the lock body **70*b***.

Lock body 16 is preferably in two halves **70*a* and 70*b* joined together. To reinforce the joint 72 between the lock body halves, internal reinforcing (e.g., metal) rings 74 are located proximate joint 72**.

Figure 4:
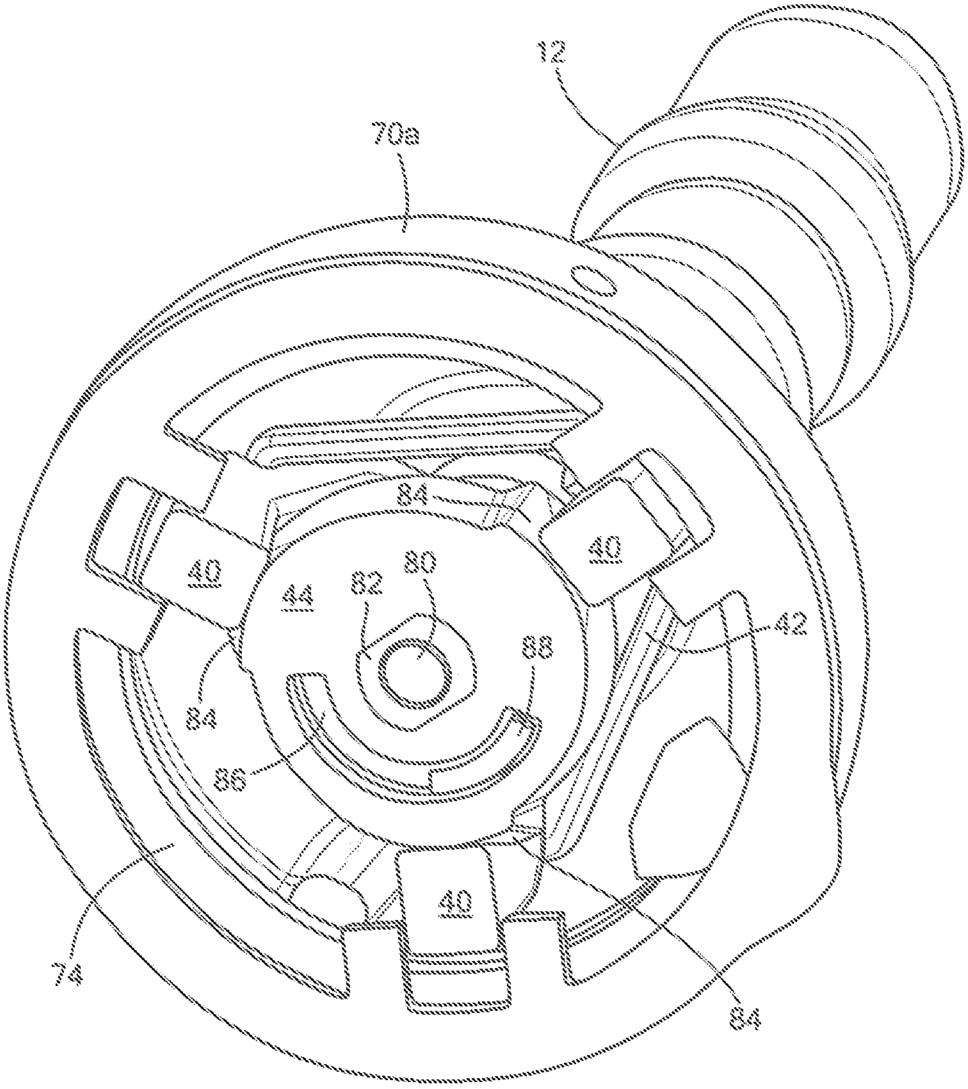
FIG. 4 is another schematic cross-sectional view of the new lock.

Cam 44, FIG. 4 preferably includes keyed opening 80 to receive the rotatable key member plug distal post 82 such that rotation of plug 24 rotates cam 44 so cam surfaces 84 pivot the lock members 40 outward. Preferably, cam 44 further includes bottom curved track 86 and the key mechanism plug distal end includes curved rail 88 retrained via track 86 to limit the rotational extent of cam 44 between the lock and unlock positions of the lock members 40.

Figure 5:
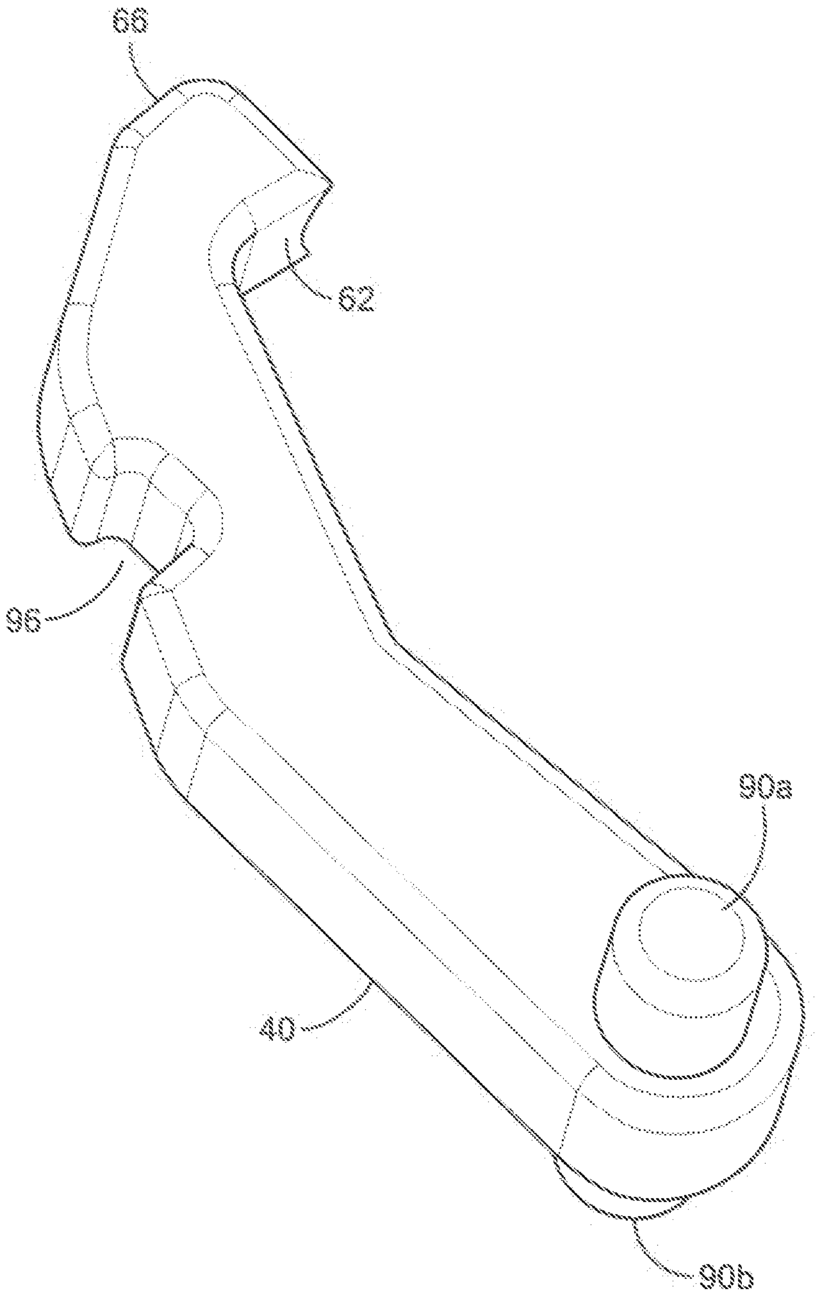
FIG. 5 is a schematic three-dimensional view of an example of a lock member.
Figure 6:
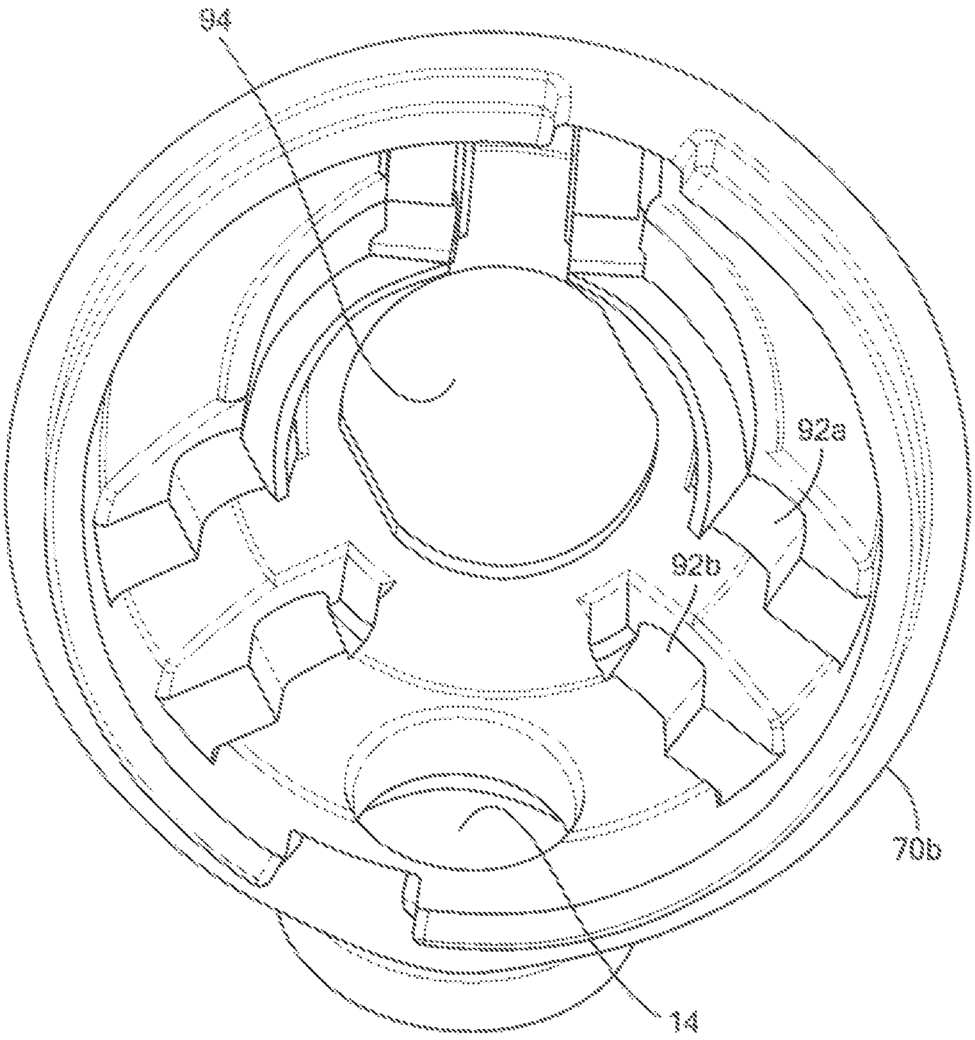
FIG. 6 is a schematic view showing a part of the lock body housing with cradle for the lock members.
Figure 7:
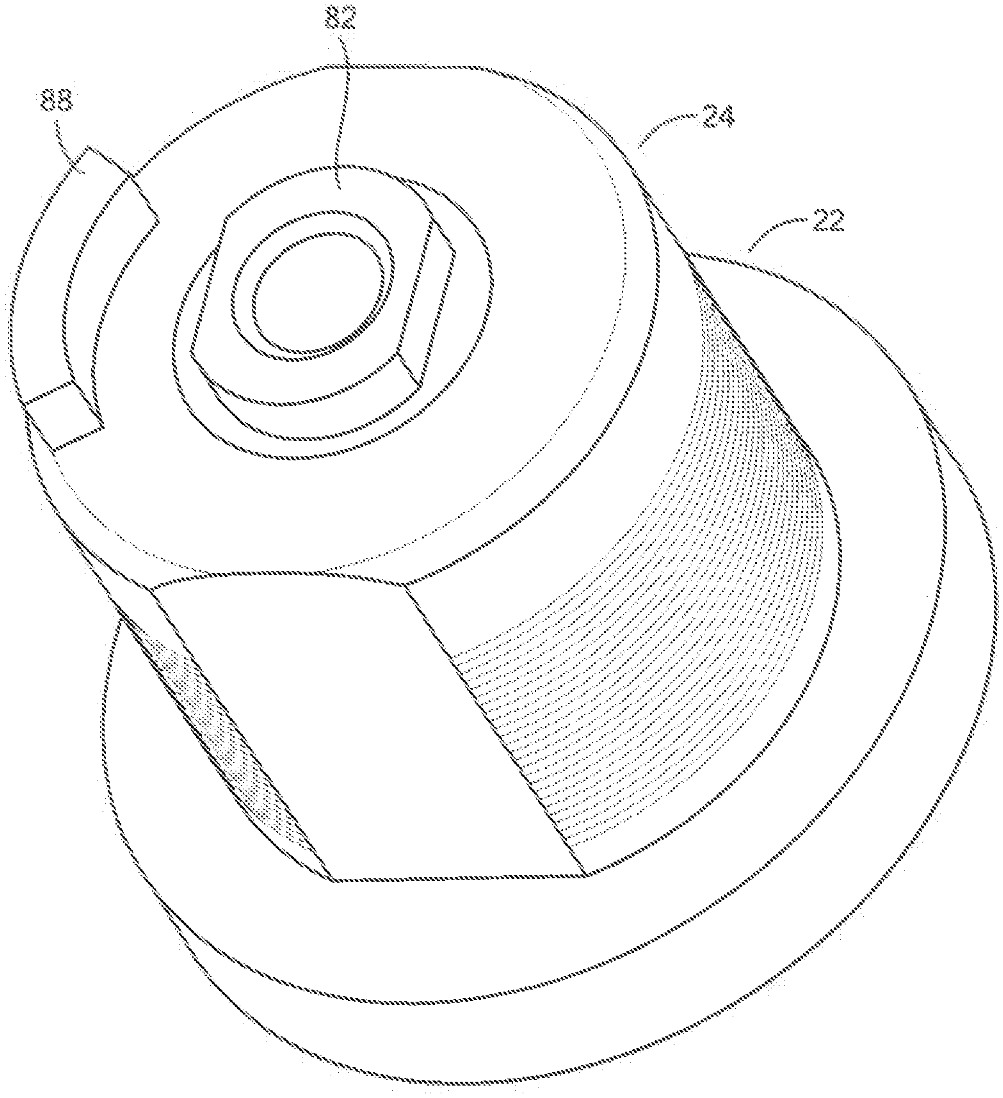
FIG. 7 is a schematic view showing an example of a lock mechanism.

FIG. 5 shows a single preferred lock member 40 with proximal lower side posts **90*a*, 90*b* pivotably received in cradle members 92*a*, 92*b*, FIG. 6, respectively, of the lock body half 70*b* which also includes port 14 for one end of the cable and opening 94 for the lock mechanism shown in FIG. 7. Lock member 40, FIG. 5 also includes channel 96 for the elastic band 42, FIGS. 2-3**.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A cable lock comprising:
a cable;
a shackle pin connected to one end of the cable; and
a lock body connected to the other end of the cable and including:
a spring biasing the shackle pin out of the lock body;
at least one lock member pivotable from an open position disengaged from the shackle pin and biased to a closed position engaging the shackle pin,
a key mechanism including a plug rotatable when a key is inserted therein, and
a cam member rotated by the plug and including a cam surface configured to pivot the lock member to the open position, the cam member including a keyed opening and the key mechanism plug including a distal post received in the cam keyed opening.

2. The lock of claim 1 in which the key mechanism is configured such that the key cannot be removed unless the plug is rotated to the locked position.

3. The lock of claim 1 in which the cam member includes a curved track and the key mechanism plug further includes a curved rail received in the curved track of the cam to limit the rotation of the cam.

4. The lock of claim 1 further including a fastener extending through the cam member and into the key member plug.

5. The lock of claim 1 further including a reinforcing ring about the interior of the lock body.

6. The lock of claim 5 in which the lock body includes two halves and the reinforcing ring is disposed at a joint between the two halves.

7. The lock of claim 1 in which the majority of the lock body includes curved surfaces.

8. A cable lock comprising:
a cable;
a shackle pin connected to one end of the cable; and
a lock body connected to the other end of the cable and including:
a plurality of spaced lock members pivotably seated in cradle members in the lock body and an elastic band about the lock members biasing them into a closed position engaging the shackle pin, the shackle pin, when inserted into the lock body driving the lock members outward,
a key mechanism including a plug rotatable when a key is inserted therein and
a cam member rotated by the plug and configured to pivot the lock members to their open position, the cam member including a keyed opening and the key mechanism plug includes a distal post received in the cam keyed opening.

9. The lock of claim 8 including a spring biasing the shackle pin out of the lock body.

10. The lock of claim 8 in which the cam member includes a curved track and the key mechanism plug further includes a curved rail received in the curved track of the cam to limit the rotation of the cam.

11. The lock of claim 8 further including a fastener extending through the cam and into the key member plug.

12. The lock of claim 8 further including a reinforcing ring about the interior of the lock body.

13. The lock of claim 8 in which the lock body includes two halves and the reinforcing ring is disposed at a joint between the two lock body halves.

14. The lock of claim 8 in which the majority of the lock body includes curved surfaces.

15. A cable lock comprising:

a cable;

a shackle pin connected to one end of the cable; and a lock body connected to the other end of the cable and including:

at least one lock member pivotal from an open position disengaged from the shackle pin and biased to a closed position engaging the shackle pin, a key mechanism including a plug rotatable when a key is inserted therein, and a cam member rotated by the plug and including a cam surface which engages and pivots the lock member to its open position when a key is inserted into the key mechanism plug and rotated and in which the cam surface does not engage the lock member when the key is removed from the lock member plug, the cam member including a keyed opening and the key mechanism plug includes distal post received in the cam keyed opening.

16. The lock of claim 15 including a spring biasing the shackle pin out of the lock body.

17. The lock of claim 15 in which the cam member includes a curved track and the key mechanism plug further includes a curved rail received in the curved track of the cam to limit the rotation of the cam.

18. The lock of claim 15 further including a fastener extending through the cam and into the key member plug.

19. The lock of claim 15 further including a reinforcing ring about the interior of the lock body.

20. The lock of claim 19 in which the lock body includes two halves and the reinforcing ring is disposed at a joint between the two lock body halves.

21. The lock of claim 15 in which the majority of the lock body includes curved surfaces.

22. A cable lock comprising:

a cable including a wire rope surrounded by interlocking metal beads that are free to rotate;

a shackle pin connected to one end of the cable; and a lock body interlocked with the other end of the cable and including:

at least one lock member moveable from an open position disengaged from the shackle pin and biased to a closed position engaging the shackle pin, a key mechanism including a plug moveable when a key is inserted therein, and a cam member moved by the plug and including a cam surface configured to move the lock member to the open position, the cam member including a keyed opening and the key mechanism including a distal post received in the cam member keyed opening.

23. A cable lock comprising:

a cable;

a shackle pin connected to one end of the cable; and a lock body connected to the other end of the cable and including:

at least one lock member pivotable from an open position disengaged from the shackle pin and biased to a closed position engaging the shackle pin, a key mechanism including a plug rotatable when a key is inserted therein, and a cam member rotated by the plug and including a cam surface configured to pivot the lock member to the open position, the cam member including a curved track and the key mechanism plug includes a curved rail received in the curved track of the cam to limit the rotation of the cam.

24. A cable lock comprising:

a cable;

a shackle pin connected to one end of the cable; and a lock body connected to the other end of the cable and including:

a plurality of spaced lock members pivotably seated in cradle members in the lock body and an elastic band about the lock members biasing them into a closed position engaging the shackle pin, the shackle pin, when inserted into the lock body driving the lock members outward, a key mechanism including a plug rotatable when a key is inserted therein and a cam member rotated by the plug and configured to pivot the lock members to their open position, the cam member including a curved track and the key mechanism plug includes a curved rail received in the curved track of the cam to limit the rotation of the cam.

25. A cable lock comprising:

a cable;

a shackle pin connected to one end of the cable; and a lock body connected to the other end of the cable and including:

at least one lock member pivotal from an open position disengaged from the shackle pin and biased to a closed position engaging the shackle pin, a key mechanism including a plug rotatable when a key is inserted therein, and a cam member rotated by the plug and including a cam surface which engages and pivots the lock member to its open position when a key is inserted into the key mechanism plug and rotated and in which the cam surface does not engage the lock member when the key is removed from the lock member plug, the cam member including a curved track and the key mechanism plug includes a curved rail received in the curved track of the cam to limit the rotation of the cam.

26. A cable lock comprising:

a cable including a wire rope surrounded by interlocking metal beads that are free to rotate;

a shackle pin connected to one end of the cable; and a lock body interlocked with the other end of the cable and including:

at least one lock member moveable from an open position disengaged from the shackle pin and biased to a closed position engaging the shackle pin, a key mechanism including a plug moveable when a key is inserted therein, and a cam member moved by the plug and including a cam surface configured to move the lock member to the open position, the cam member including a curved track and the key mechanism plug includes a curved rail received in the curved track of the cam to limit the rotation of the cam.

27. A cable lock comprising:

a cable;

a shackle pin connected to one end of the cable; and a lock body including two halves with a reinforcing ring disposed at a joint between the two body halves, the lock body connected to the other end of the cable and including:

at least one lock member pivotable from an open position disengaged from the shackle pin and biased to a closed position engaging the shackle pin, a key mechanism including a plug rotatable when a key is inserted therein, and a cam member rotated by the plug and including a cam surface configured to pivot the lock member to the open position.

28. A cable lock comprising:

a cable;

a shackle pin connected to one end of the cable; and a lock body including two halves with a reinforcing ring disposed at a joint between the two body halves, the lock body connected to the other end of the cable and including:

a plurality of spaced lock members pivotably seated in cradle members in the lock body and an elastic band about the lock members biasing them into a closed position engaging the shackle pin, the shackle pin, when inserted into the lock body driving the lock members outward, a key mechanism including a plug rotatable when a key is inserted therein and a cam member rotated by the plug and configured to pivot the lock members to their open position.

29. A cable lock comprising:

a cable;

a shackle pin connected to one end of the cable; and a lock body including two halves with a reinforcing ring disposed at a joint between the two body halves, the lock body connected to the other end of the cable and including:

at least one lock member pivotal from an open position disengaged from the shackle pin and biased to a closed position engaging the shackle pin, a key mechanism including a plug rotatable when a key is inserted therein, and a cam member rotated by the plug and including a cam surface which engages and pivots the lock member to its open position when a key is inserted into the key mechanism plug and rotated and in which the cam surface does not engage the lock member when the key is removed from the lock member plug.

30. A cable lock comprising:

a cable including a wire rope surrounded by interlocking metal beads that are free to rotate;

a shackle pin connected to one end of the cable; and a lock body including two halves with a reinforcing ring disposed at a joint between the two body halves, the lock body interlocked with the other end of the cable and including:

at least one lock member moveable from an open position disengaged from the shackle pin and biased to a closed position engaging the shackle pin, a key mechanism including a plug moveable when a key is inserted therein, and a cam member moved by the plug and including a cam surface configured to move the lock member to the open position.

* * * * *